US008510371B2

(12) United States Patent
Peled

(10) Patent No.: US 8,510,371 B2
(45) Date of Patent: Aug. 13, 2013

(54) METHOD AND SYSTEM FOR CREATING IT-ORIENTED SERVER-BASED WEB APPLICATIONS

(75) Inventor: Guy Peled, RaAnana (IL)

(73) Assignee: Gizmox Ltd., Kfar-Saba (IL)

( * ) Notice: Subject to any disclaimer, the term of this patent is extended or adjusted under 35 U.S.C. 154(b) by 0 days.

(21) Appl. No.: 12/523,177

(22) PCT Filed: Jan. 16, 2008

(86) PCT No.: PCT/IL2008/000066
§ 371 (c)(1),
(2), (4) Date: Jul. 15, 2009

(87) PCT Pub. No.: WO2008/087636
PCT Pub. Date: Jul. 24, 2008

(65) Prior Publication Data
US 2010/0115023 A1    May 6, 2010

Related U.S. Application Data

(60) Provisional application No. 60/901,674, filed on Jan. 16, 2007.

(51) Int. Cl.
*G06F 15/16*    (2006.01)
(52) U.S. Cl.
USPC .......................................................... 709/203
(58) Field of Classification Search
USPC ................................................ 709/203, 223
See application file for complete search history.

(56) References Cited

U.S. PATENT DOCUMENTS

| 6,115,646 | A  | * | 9/2000  | Fiszman et al. ................ 700/181 |
| 6,882,825 | B2 | * | 4/2005  | Hopkins et al. ................ 434/350 |
| 2003/0195995 | A1 |   | 10/2003 | Tabbara |
| 2004/0028212 | A1 |   | 2/2004  | Lok et al. |
| 2004/0153998 | A1 |   | 8/2004  | McGuire et al. |
| 2004/0158837 | A1 | * | 8/2004  | Sengodan ...................... 719/313 |
| 2005/0039173 | A1 | * | 2/2005  | Tondreau et al. .............. 717/136 |
| 2005/0086670 | A1 | * | 4/2005  | Christensen et al. .......... 719/330 |

(Continued)

FOREIGN PATENT DOCUMENTS

| CN | 1510608 | 7/2004 |
| CN | 1670698 | 9/2005 |

(Continued)

OTHER PUBLICATIONS

International Preliminary Report on Patentability Dated Dec. 30, 2009 From the International Bureau of WIPO on Behalf of the International searching Authority Re.: Application No. PCT/IL2008/000066.

(Continued)

*Primary Examiner* — Jason Recek

(57) ABSTRACT

A method of application object management. The method comprises initializing and managing at least one application object on a server, forwarding a command indicative of a state of the at least one application object to a client hosting a browser and a kernel so as to allow the kernel to render the at least one application object according to the state by the browser, receiving, from the client, at least one client event pertaining to the at least one rendered application object, and updating the state by processing the at least one client event on the server.

19 Claims, 3 Drawing Sheets

(56) References Cited

U.S. PATENT DOCUMENTS

| | | | |
|---|---|---|---|
| 2005/0097008 A1* | 5/2005 | Ehring et al. | 705/26 |
| 2005/0155027 A1 | 7/2005 | Wei | |
| 2005/0216670 A1* | 9/2005 | Atkinson et al. | 711/118 |
| 2005/0228872 A1 | 10/2005 | Pavlik et al. | |
| 2006/0020693 A1* | 1/2006 | Hellstrom | 709/223 |
| 2006/0089147 A1* | 4/2006 | Beaty | 455/445 |
| 2006/0117172 A1 | 6/2006 | Zhang et al. | |
| 2006/0256130 A1* | 11/2006 | Gonzalez | 345/619 |
| 2007/0008973 A1* | 1/2007 | Galea | 370/392 |
| 2007/0250572 A1* | 10/2007 | Paila et al. | 709/204 |
| 2008/0071922 A1* | 3/2008 | Chetuparambil et al. | 709/236 |
| 2010/0153498 A1* | 6/2010 | Hutcheson et al. | 709/205 |

FOREIGN PATENT DOCUMENTS

| | | |
|---|---|---|
| CN | 1874247 | 12/2006 |
| CN | 101075864 | 11/2007 |
| JP | 2003-323402 | 11/2003 |
| WO | WO 2008/087636 | 7/2008 |

OTHER PUBLICATIONS

Supplementary European Search Report and the European Search Opinion Dated Feb. 10, 2011 From the European Patent Office Re. Application No. 08702647.2.

Communication Pursuant to Rules 70(2) and 70a(2) EPC Dated Mar. 1, 2011 From the European Patent Office Re. Application No. 08702647.2.

Translation of Office Action Dated Oct. 26, 2011 From the State Intellectual Property Office of the People's Republic of China Re. Application No. 200880008613.2.

Response Dated Sep. 12, 2011 to Communication Pursuant to Rules 70(2) and 70a(2) EPC of Mar. 1, 2011 From the European Patent Office Re. Application No. 08702647.2.

Response Dated Sep. 13, 2011 to Supplementary European Search Report and the European Search Opinion of Feb. 10, 2011 From the European Patent Office Re. Application No. 08702647.2.

Office Action (Enquiry) of the State Examination Dated Nov. 23, 2011 From the Patent Office of the Russian Federation, Federal Institute of Industrial Property of the Federal Service for Intellectual Property, Patents and Trademarks Re. Application No. 2009130915 and Its Translation Into English.

Examiner's Report Dated Sep. 6, 2011 From the Australian Government, IP Australia Re. Application No. 2008206688.

Office Action Dated Oct. 25, 2012 From the Israel Patent Office Re. Application No. 199860 and Its Translation Into English.

Translation of Notice of Reason for Rejection Dated Nov. 13, 2012 From the Japanese Patent Office Re. Application No. 2009-546066.

Examiner's Report Dated Apr. 20, 2012 From the Australian Government, IP Australia Re. Application No. 2008206688.

Translation of Office Action and Search Report Dated Jul. 23, 2012 From the State Intellectual Property Office of the People's Republic of China Re. Application No. 200880008613.2.

\* cited by examiner

METHOD AND SYSTEM FOR CREATING IT-ORIENTED SERVER-BASED WEB APPLICATIONS

RELATED APPLICATIONS

This Application is a National Phase of PCT Patent Application No. PCT/IL2008/000066 having International filing date of Jan. 16, 2008, which claims the benefit of U.S. Provisional Patent Application No. 60/901,674 filed on Jan. 16, 2007. The contents of the above Applications are all incorporated herein by reference.

FIELD OF THE INVENTION

The present invention relates to Web applications. More particularly, the invention relates to a method and system for creating IT (Information Technology)-oriented server-based Web applications to be presented over a data network, such as the Internet.

Definitions, Acronyms and Abbreviations

Throughout this specification, the following definitions are employed:

Event: is an action performed by a user on an application.

Critical Event: is an event should be immediately sent to the server in order to synchronize the client and the server states (as opposed to an event that can be sent in a delayed time).

Unique Event: is an event that eventually would be sent to the server.

Accumulated Event: is a client side event that is stored in a client event queue until the next Critical Event occurs. Then, when a Critical Event happens, the client will send. the whole queue of events which occurred between the previous Critical Event and the current one.

Client: or Client Tier is a user terminal (e.g. webpage) connected to a server.

Control: is a displayable application component (e.g. button, field, etc . . . ). Every control can perform defined operations (e.g. getting keyboard input, pushing, etc . . . ).

Container: is the window which contains controls.

Splitter: is a side panel like control (either horizontal or vertical) which is positioned between two docked/anchored controls and which enables changing the ratio of size (width or height) of those controls one on account of the other by dragging it.

Dedicated Kernel:

In the context of the present invention a dedicated kernel is a small and static piece of code which is downloaded only once by the client at the first time the client approaches the application at the server side. This dedicated kernel mediates between the client's side browser and the application and is responsible for:

Sending and receiving any sort of data to and from the server;
Activating XSL (a language for formatting an XML document: for example, showing how the data described in the XML document should be presented in a Web page) Transformations (show how the XML document should be reorganized into another data structure which could then be presented by following an XSL style sheet) or any other presentation layer's lay-outing techniques;
Aggregating user events (e.g., keyboard presses and mouse events), accumulating non-critical event queues and sending those event queues whenever desired to the server;
Reflecting any client side's controls behavior which is achieved by client languages code.

Application Object Index: is a collection of application objects that holds component ID (Identification) of the application object instance. This index is used to process event queues sent from the client by retrieving the triggered event object owner by its ID and passing event processing responsibility to the mapped object instance. This allows a week dependency between the client and the server object instances which can be expressed in standard XML syntax using the instance ID.

Application Object Tree: is an object tree containing application objects in a hierarchical tree structure, representing the application GUI (Graphical User Interface) structure.

Application Root: is an application object that is bounded to a configured page name which is accessible by activating it directly so that it acts as an entry point of the application object tree. Saying that the application root it browse-able directly by typing a URL in the browser (when using the present invention on web platform, for example).

Main Form Window: is the first window that the user sees when he accesses a URL that is processed by this technology. It is equivalent to the main window that opens when you start a desktop application.

Client Time Stamp: is a time stamp of an object on the client side, representing the last update time.

Request Time Stamp: is a time stamp indicating the current browser status, which is the last time the browser had received an update command from the server.

Time Stamp: is a numeric value representing the last update time of the given application object.

Unique Accumulated Event: is a new event that replaces any event having the same ID, since the old one is out of date.

Update Commands: is a set of XML (Extensible Markup Language) elements that the browser executes in order to be synchronized with the application object tree and the server control state.

Window Structure: is a set of XML elements representing the current windows structure of the application. The Window Structure is used to update the Client tier's state (the currently drawn UI) according to the Server tier state (the current UI state on the server).

XSLT Templates: are a set of$_{13}$ XSLT (Extensible Stylesheet Language Transformations) which describes the transformation that has to be done on the data in order to draw the reflected controls on a Client tier (e.g., web browser).

XML data behind: is an XML (Extensible Markup Language) that is used by the client to store the state of an application interface. The application interface state holds the properties of every UI control and contains all the information needed by the client to synchronize its controls state according to the server's state. For example, a color or dimension of a control, the text that it shows etc. This provides the Client tier with the ability to redraw any part of the UI using XSLT (Templates transformation) on the data behind XML.

BACKGROUND OF THE INVENTION

Nowadays, HTML (HyperText Markup Language) is a global standard language, which is copyright free and available for use by all developers, and further supported by all programming environments. The ability to offer links for navigation and its multimedia support capability (sound, pictures, animations, etc.) caused the world to adopt the HTML as the industry mainstream. Also, recently, the DHTML (Dynamic HTML) language was presented. DHTML is a collection of technologies used together to create interactive and animated Web sites by using a combination of a static markup language (such as HTML), a client-side scripting language (such as JavaScript™), a presentation definition language (Cascading Style Sheets, CSS), and a Document Object Model (programming interface). Thus, the DHTML language enabled better interactivity with the Internet users. The penetration of the Internet into all information driven walks of life and the fast spread of the Internet among users, along with the growing demands by the business and commercials sectors as a mean of communication with their users, brought about the need for more dynamic and heavier remote server/client oriented internet applications. This led to the introduction of ASP (Application Service Provider), PHP (Hypertext Preprocessor) and other web application languages/environments that presented new utilities, such as dynamically created pages that were static before. These new environments introduced the capability to expose and receive data from conventional HTML pages.

The demand for higher server-client performance of IT (Information Technology) Web oriented applications currently can not answer the growing needs for more sophisticated IT applications. In spite of the significant evolution of the internet that is becoming the major mediator in IT uses, the basic principals supporting these usages remained the same as a couple of decades ago. Nowadays, ASP.NET (Active Server Pages) and JSP (Java® Server Pages) offer better "server side" development environment. On the client side, HTML pages, containing scripts that call server-side pages, i.e. pages are fully reconstructed on each action on the sever side, resulting in slow and limited performances. Furthermore, using web applications, which are heavily script-dependent, has become the main practice of Web developers. The Web applications needs are becoming more and more resemble to the computer desktop needs. More features that have been only supported by desktop applications have become essential for Web applications. This demand came with a high price tag in terms of a bandwidth, i.e., web transportation resources. Client side scripts started to be more and more complex, making Web application hard to design and maintain. In addition, the performance problems of such applications are very common. It is easy to mess things up, as scripts offer no code access limitations, and poor object oriented programming concepts, if at all.

Also, the security issue remains one of the major problems of the current Web-oriented technologies, since the scripts run on a client browser (e.g., Microsoft® Internet Explorer). The use of script languages, being embedded into the user's browser, has made Web applications to be exposed to malicious tampering, since pages that serve as data providers for Web applications are hard to protect. A large part of the data is processed by the browser at the user's side (and not at the server side), and therefore exposing more data than required.

Furthermore, the ASP.NET and JSP have become outdated since they are not able to cope well enough with current IT needs. Even though they introduced stronger programming possibilities, such as new infrastructural programming utilities, new modeling and reuse capabilities (reuse capabilities are the ability to create components once and use them later multiple times), still the basic concepts remain the same, reflecting the same problems described above (i.e., performance and user experience, security, complexity of development and maintenance). The page-based approach of these environments makes it a poor environment for developing Web application, since there is no server side support for opening windows or interacting between frames (since a lot of window management code should be written in client scripting languages distributing the business logics to a few languages and locations). There is limited development support for partial updating of the user interface, leaving the developer with the need to explicitly manage partial updating and deteriorating the development process productivity. In addition, the current IT systems bandwidth constrained and they are not able to support more sophisticated needs that require larger processing resources. This leads to valuable users' time waste. The sophisticated actions cause slow browser scripts perform, wherein each action is calling a different page that is being fully recreated by the server and fully rendered by the browser. Currently, the developer is the only one who decides what will be the content of the data transferred between the client side and the server side. This fact causes the data to be very inconsistent and informal, i.e., the data can contain presentation data, business data, and all sorts of security tokens and various other types. Furthermore, the data can be of any format e.g., plain text, XML or any other format. Several developers and moreover several projects can use several and very different protocols of data and formats sent and received to the server and returned from the server. A developer must learn many Internet languages, which requires considerable training, and therefore the qualified personnel are hard to find.

In desktop application development environments, the control positioning is divided into docking and anchoring. Docking is the ability to take a list of controls and give each of them one of the five docking behaviors (Left, Top, Right, Bottom, and Fill) and using these definitions to create the screen layout. Each control is independent, but is placed in relation to the other controls without overlapping. That way there's no need to update the positioning of all the controls when updating one. Anchoring is the ability to define virtual strings that are tied from a control edge's (one, some or all of them) to its container. When the control's container is resized, moved or both the distance between the anchored-to container's side panels and the anchored control's side panels will remain static on side panels which the control is anchored to. This can result in the control's resize when anchoring to opposite side panels (e.g., left+right and/or top+bottom).

The conventional web application development environments provide the programmer an object module (the output of an assembler or compiler, which is in the machine code of the target computer. Object modules must be linked with other modules to create the final executable program) representing HTML elements for building the page content. The page layout is done using three tools:
1. HTML tables (which can contain the text of the web and can be also used to layout any HTML elements.
2. Flow control styles such as CSS (cascading style sheets) layout definitions.
3. Absolute positioning which allows positioning any browser displayed element (i.e. Button, List etc.) by specifying the exact location of the element regardless of other displayed elements. This methodology is very difficult to use when developing a web site which should act as an application.

All the above describes the complicated work environment of web application design. It also presents the drawbacks and the limitations of the usage of these applications.

In the closest prior art (Pub. No.: 2003/0200254 A1), the application tasks' are divided between the server and the client. A client using this application must install a service program (JAVA applet). It means that some processing tasks are done in the client side. That limits the user for installation authorized computers only and to specific operating system and web browser. It also makes it less adaptable for the operating system and web browser updates. Another disadvantage of the client side, having some of the application processing tasks, is in the communication method. Data packages, which probably contain significant information, must be sent from the client side to the server and vice versa. Such communication is far from being ideal in manners of data size (bandwidth) and time. It also holds security risks since significant information is available on the client side, which is connected to the global network.

The "Microsoft's "Remote Desktop Connection" is an application that enables using application on servers/computers through a data network. The application actually runs on server/computer and a user, using other computer/terminal connected to a network, can operate the application. The method used here is sending the screen as a bitmap of the application to the user/client. The client sends keyboard and mouse events back. The data sent from the server is the screen capture (bitmap) of the application on the server, reflecting the exact screen display generated on the server. In order to get a smooth picture on the user side, the bitmaps are sent from the server frequently. The data packages are big and the transmitting rate is high. This cause to mass activity on the network and consuming allot of network resources (bandwidth). This application requires both, the server and the client, to use the same operating system. The client side also required to install an applet to support the application.

The main purpose of the preset invention is to overcome all these drawbacks, both of the design and the usage of web applications, despite all the limitations. In other words, using the same circumstances of design complexity and web transportation resources, the present invention enables a relatively simple design method and system, and much more efficient and secure usage of IT-oriented server-based web applications.

It is an object of the present invention to disclose a system and method for providing IT-oriented server-based Web applications.

It is still another object of the present invention to provide a method and system that enables to program server-based Web applications similarly to programming desktop applications.

It is still another object of the present invention to provide a method and system wherein a unified object model handles all application needs such as handling a web application with multiple windows, managing the communication between the server and the browser, sending applications events (events queues) and getting back commands to update the UI (User Interface) when required.

It is still another object of the present invention to provide a method and system, which does not employ client scripting languages or any other web language such as JavaScript.

It is still another object of the present invention to provide a method and system, which the developer uses a single, organized and object oriented language such as C#, VB.NET or any other language that supports full object-oriented programming and compilation capabilities, eliminating the developer need for common web design languages knowledge.

It is a further object of the present invention to provide a method and system, in which all processing is done at the server side; the user's browser is used only to receive input commands and display output, accordingly.

It is still a further object of the present invention, to provide a method and system, in which the data transmission capacity is significantly reduced, compared to the prior art.

It is still a further object of the present invention, to provide a method and system, in which the significantly higher security level is achieved, compared to the prior art.

It is still a further object of the present invention, to provide a method and system, in which the design of a Web page (presented on a user's computer screen/display) is loaded only once, without the need to reload it again for updating the data presented on said Web page.

It is still a further object of the present invention to provide a method and system, in which the relatively low bandwidth and processing resources are used at the client side.

It is an object of the present invention to provide a method and system for providing developers of IT-oriented server-based Web application with a new developing environment that is compliant with the Microsoft® developing environment.

Other objects and advantages of the invention will become apparent as the description proceeds.

SUMMARY OF THE INVENTION

The present invention is directed to a method for allowing a computerized system to use IT-oriented server-based Web applications to be presented over a data network. Accordingly, an application is installed on a server side, being in data communication with a client side terminal over the data network. A dedicated kernel is downloaded once to the client side, for mediating (e.g., managing the client side communication protocol) between the application and the client's side. At the client side, events are associated with corresponding ID tags that represent application objects and a timestamp is assigned to each event. Events are queued and sent to the application in the form of a queue of events, only when a critical event occurs. At the server side, events are translated to application actions by associating between them and the application objects, using the ID tags. If the application objects of the client is more updated by comparing between the timestamp of each received event and the last updated timestamp of the application object, a data packet containing only updating commands for the client side to update the relevant layout objects reflecting the application updates is prepared and sent back to the client side as updates. Finally, the screen layout objects at the client side are updated by a presentation layer, according to the content of the data packet.

The client side may be any web browser operating under any operating system. The presentation layer is independent of the code of the dedicated kernel and may be DHTML, WinForms® (a framework for building Windows client applications that utilize the common language runtime. WinForms® applications can be written in any language that the common language runtime supports), Microsoft®Silverlight™ (is a browser plugin that allows web applications to be developed) or that can be supported by any other presentation layer that can send and receive XML codes.

The Dedicated Kernel may be a code which changes between different supported presentation layers. Data exchange between the server and the client's side is performed using only XML.

The present invention is also directed to a method for programming an IT-oriented server-based Web applications to be presented at the client side over a data network, by allowing programming a web application similarly to desktop application programming using any Object Oriented programming language by converting the programmed application to web application by making adaptation of objects and their associated logic to web design languages. The programmed application may be based on another web application that was developed using different design tools.

BRIEF DESCRIPTION OF THE DRAWINGS

The above and other characteristics and advantages of the invention will be better understood through the following illustrative and non-limitative detailed description of preferred embodiments thereof, with reference to the appended drawings, wherein.

DETAILED DESCRIPTION OF THE PREFERRED EMBODIMENTS

Figure 1:
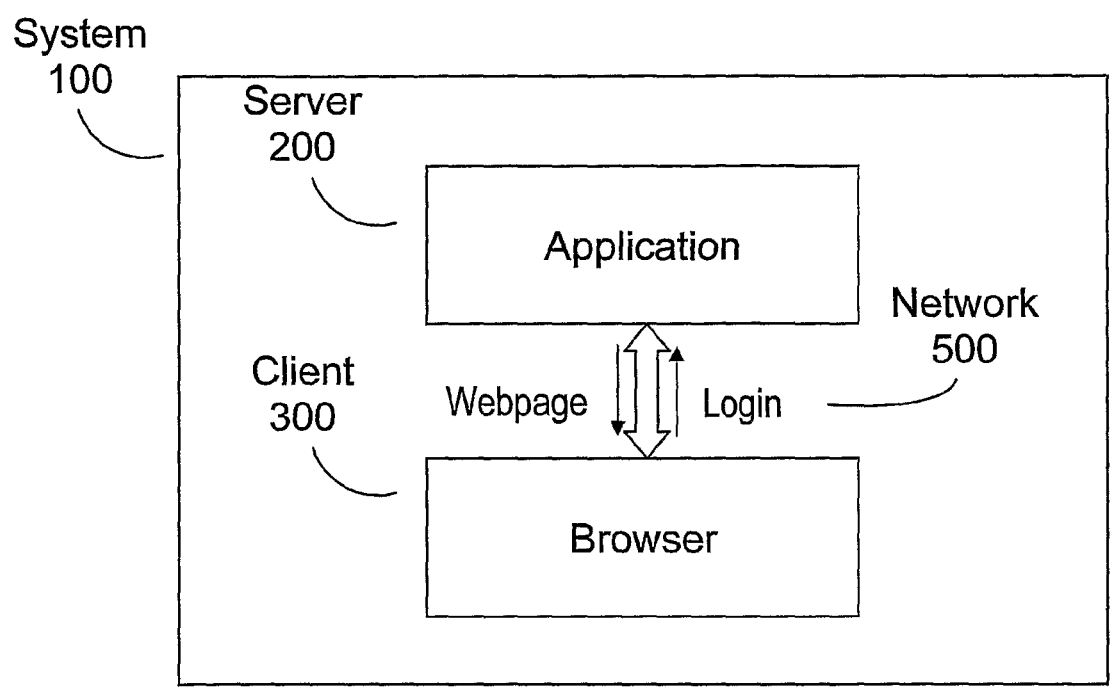
FIG. 1 is a schematic illustration of the client side initialization of the system proposed by the invention.

The system of the invention takes a step forward the field of client-server IT application, both in the design of these applications and in the usage of the system. The innovation in the design derives by using any Object Oriented (OO) design software (high level programming language) to design web application. It totally eliminates the necessary of the designer for common web/internet programming tools (e.g. HTML, XML, CSS etc.). This system's character makes the web application design accessible to any programmer and not only to those who have specialized in web/internet design languages. Another clear advantage of the system of the invention is by using a single programming language instead of several. The layout design in use at the system of the invention is much more simple then the common method in the prior arts. There is no need to describe the figures and the properties of windows and controls in characters/numbers, but only use 'drag and drop' method. The same as done in some desktop applications design tools such as "Visual Studio". There is also implementation of the layout design method-docking and anchoring (described in the background of the invention), which make the layout design and modification much more simple and user-friendly.

The innovation and the advantages using the system of the invention are projected also at the client (user) side the server-client communication method.

The client benefits a total liberty choosing any operating system and web browser for his convenience. The client is also not restricted by special authorizations since no local installation is necessary. Therefore, the client can use any computer connected to the global network (or local network of the server), under any operation system and any browser. It achieved by holding the entire application tasks' at the server side. The client side only projects the desirable screen. It means that the client holds no significant information on his side, but only the projected data. The projected data is not stored by any mean (e.g. 'cookies'—website memory on a local hard drive) in the client side. The client uses a dedicated kernel to decode the data received from the server and to translate it to screen display. The dedicated kernel is also used to encode the data transmitted to the server. These characteristics of the system of the invention make it also highly secured, compared to the prior arts, and also make the communication much more efficient in term of data packages size to be sent from the client to the server and vise versa.

More aspects of the communication method in the system of the invention are described hereinafter. The communication between the server and the browser is performed using a single URL (Uniform Resource Locator—address of web site) utilizing the main application window. The application can be consist of many windows, but still the communication with the server is done using a single address.

The communication of the client-server is done as follows: when a client turns to the server at the first time, the whole page is transferred to the client. This happens only once. From now on the page will be partly updated according to the client requests'. At the client side events are aggregated in a queue, and when a critical event arises, the whole queue is sent to the server. Every event at the client gets ID tag and timestamp, which uses the server to update back the client only with the necessary data. This also enables the server to serve many clients, since the server can distinguish between the clients and their requests using those tags and timestamps. The data sent from a client to the server reflects the client activities (e.g., mouse clicks on specific fields/controls, writing using the keyboard, etc.). This data is encoded to a minimal data packet and sent to the server. The server runs the application on the data and sends in return the result in a minimal data packet to the client. The client, as aforesaid, encodes the data and translates it to a screen display. This method of interaction between the server and the client involves significant reduced communication actions and data packets size comparing to prior art systems.

The IT application is designed using the system of the invention can be programmed. at the programmer computer and then be published on the network (installed on the server), or can be programmed directly on the server through the network, i.e., remote programming. The latter programming method uses the same communication method as the client-server using at the application usage of the system of the invention. In that case a programmer is a user on a client side, and the application on the server side is the design tools to build the IT application. The following illustrations refer to both cases: a remote IT application designer using the system of the invention and a user of the IT application itself. In the following descriptions application means either IT application or the design tools, and user means an IT application user or a remote programmer.

FIG. 1 is a schematic illustration of the client side initialization of the system proposed by the invention. Each time a user wants to use the application, the following process takes place. A user, operating the client side 300, using web browser on a computer/terminal connected to the server 200 through a network 500, appealing the server 200 through a pre-defined website. The server in return sends the dedicated kernel to be used by the client side 300 and the data for creating the application display on the client side 300 screen. This action, as aforesaid, occurs only once at the client system's initialization. It is, in fact, the login of a user into the system.

Figure 2:
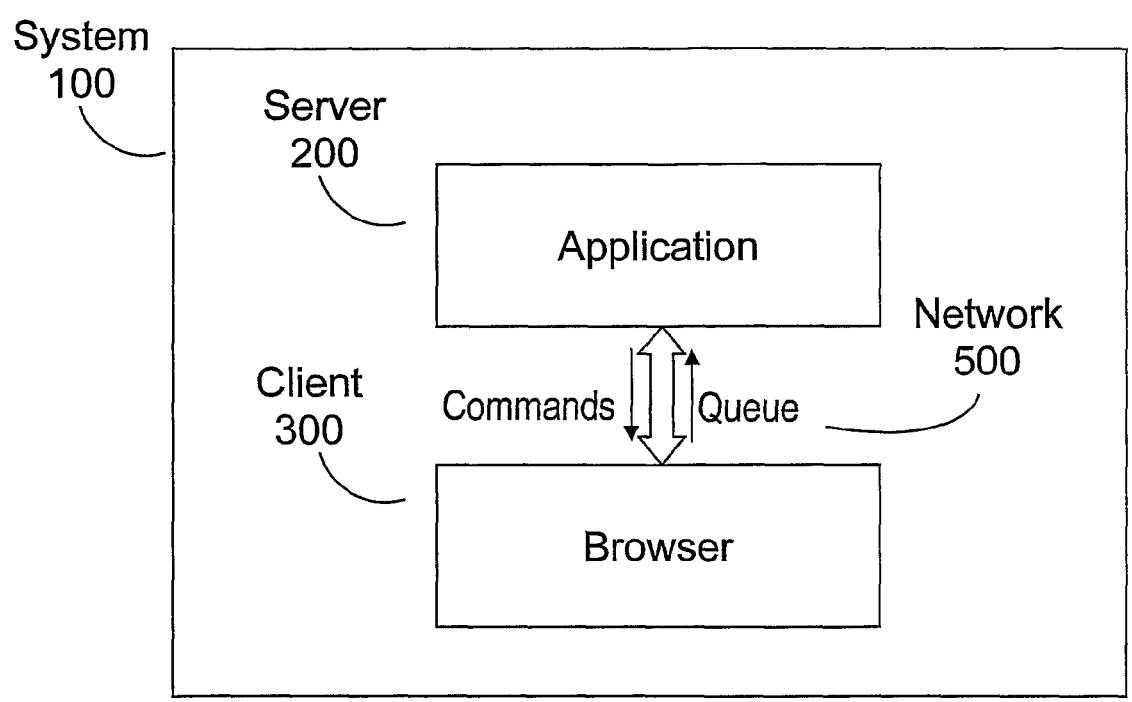
FIG. 2 illustrates the routine interaction between the server and the client side.

FIG. 2 illustrates the routine interaction between the server 200 and the client side 300. After the login, all the interaction between the user and the application is done as follows: at the client side 300, the user actions (e.g. mouse clicks, keyboard types or any other user input) on the screen are translated to events. Every event gets a unique ID and a timestamp. The events are queuing on the client side 300. When a critical event arises, the entire queue is transmitted to the server 200. As the server 200 gets the data, it translates the events into actions on the application and prepares a data packet to be sent back to the client side 300. The data packet include only the necessary information the client side 300 needs to update the display on its screen and project the result of the application's actions. These iterations occur while the user is logged in to the application.

There are cases which the user did not perform any activity (e.g., mouse clicks, keyboard presses, etc.) but an event will still be fired to the server. This can happen due to timers operations which are performed periodically by the infrastructure (such as "Keep-Connected", which is an event fired every configurable constant time which synchronizes the client and the server on idle time) or due to a developer's request for asynchronous operations (i.e., an asynchronous timer which was operated by the developer to cause asynchronous events, such as progress bars or periodic refreshes initiated by the client machine automatically).

Figure 3:
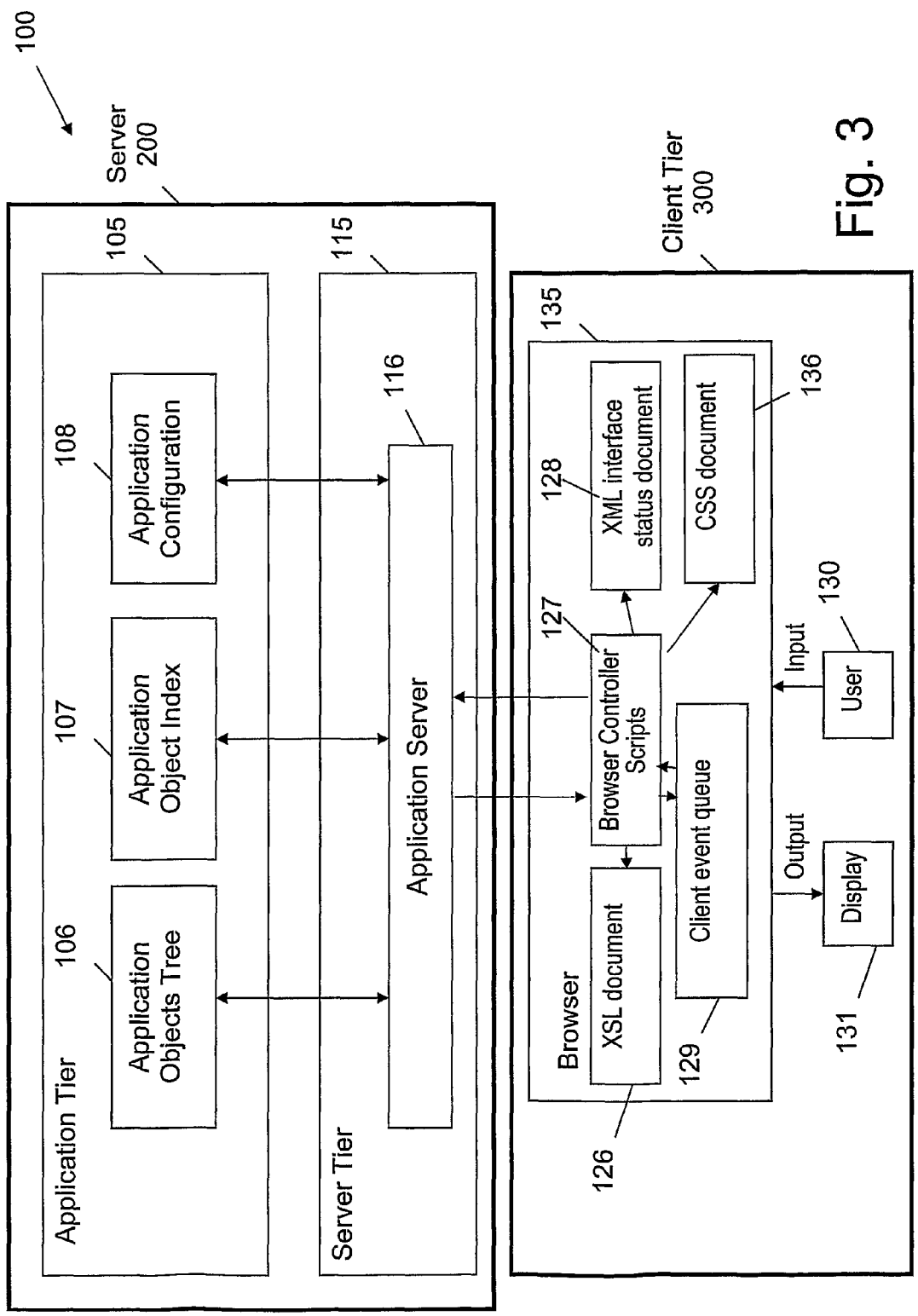
FIG. 3 is a schematic illustration of the architecture of a system for providing IT-oriented server-based Web applications, according to a preferred embodiment of the present invention.

FIG. 3 is a schematic illustration of a system 100 for providing IT-oriented server-based Web applications, according to a preferred embodiment of the present invention. System 100 comprises three tiers: an Application tier 105, a Server tier 115, and a Client tier 300. Client tier 300 interacts with Server tier 115, which in turn interacts with Application tier 105. The interaction between Client tier 300 and Server tier 115 is performed by means of events that are queued and sent from Browser 135 to Application server 116 in a XML (Extensible Markup Language) form. On the other hand, the Interaction between Server tier 115 and Client tier 300 is done by means of update commands that are sent from Application server 116 to Browser 135 in the XML form.

Application tier 105 further comprises: Application object tree 106, that can be a tree-structured object model representing the application instance (created in a program code) for keeping an application status; Application object index 107, which can be a hash table, for holding relations between component identifications to component references and which is used to get an application object reference from an application object identification; and Application configuration 108, which can be an XML document, for holding application parameters and definitions.

Server tier 115, which further comprises Application server 116, is responsible for:
  routing resource requests from the Client tier, which can be of various types to resource request handlers on the Server tier, which are the objects that should provide the application with its resources, such as Icons/Images, Data, Assemblies, Contents etc. and send the data back to the Client tier;
  routing requests to an application object (within Application object tree 106) that has requested a file can be done by adding a specific field to the submitted form that holds the application object ID and by getting its reference from the application object index. The application object index is a dictionary which holds the application objects by ID, enabling direct access to application objects by providing an ID. This way, when a request arrives to the Server tier it is routed to the appropriate Application object.
  receiving event queues and processing the events one by one in a loop on the queue items; each event is processed by the order that it has occurred in Client tier 300;
  returning update commands from Browser 135 to Application server 116 by using a time stamp sent from the Server tier on the last server response (provided within Client tier 300) to Application server 116 (provided within Server tier 115);
  handling first URL navigation by: obtaining a class which represents a container control of an entry point to the system (for example a Form container object) of the application object provided within Application object tree 106 (said class mapped to a specific URL), initializing an object from said class and returning a full update command. A full update command is a complete set of properties which enables the client to render the controls completely as opposed to partial update command which updates certain properties and therefore enables partial rendering of controls.

Client tier 300 further comprises the following software components:
  Browser 135 (e.g., Mozilla Firefox® or Microsoft® IE (Internet Explorer) browser) for surfing over a data network, such as the Internet;
  Browser controller scripts 127, which are scripts that are downloaded with the first navigation and are used as a "generic framework". A "generic framework" means that the Client tier scripting is downloaded once and is used for all purposes, as opposed to other frameworks on which each application/control/control-state requires downloading a specific script. This "generic framework" script is used for communicating with Application server 116 and updating Client tier 300 by means of update commands received from said Application server 116. The "generic framework" script enables the Client tier to commit update commands which might include, as previously mentioned, partial/full directions of what needs to be changed or re-rendered on the Client tier. The "generic framework" script also enables the Client tier to perform further communication with the server regarding to whatever happens in Client tier (Client Events) i.e. user 130 inputs clicks/double-click, text-changes, mouse-moves etc.
  an XSL document 126, which is generated on Application server 116, is used to turn update commands that are sent from Application server 116 to Browser 135 into the HTML (Hypertext Markup Language) code that replaces existing HTML code. This is done by XSL transformation of the updated XML data behind which help transforming the newly updated properties into drawn controls.;
  an XML interface status document 128 that holds the interface state and is used to render incremental updating and save interface state. By holding this XML of properties data on the Client tier, an incremental updates can be done since the Server tier can send only the required data on each stage, by updating the XML interface status document 128 and re-render only the parts that should be rendered.
  A CSS document 136 which is generated on the Server tier and is used as general styling (such as back-color, border dimensions, border-color, layout-style etc) for all rendered (Data+XSLT transformed) HTML elements.

The client events (e.g. clicks, double-clicks, mouse moves etc) are queued in Browser controller scripts 127. These client events are divided into three main categories:
  Accumulated events: these events are queued by means of Browser controller scripts 127 into Client event queue 129;
  Accumulated unique events: these events are also queues by means of Browser controller scripts 127 into Client event queue 129, but are kept as unique events: this means that if an event of this type is raised and a previous event of the same source and name already exists, then the previous one will be deleted and the new event will be queued;
  Critical events: when an event of this type is raised, it is queued as the last event and triggers the event queue which contains a chronologic list of all the non-critical events which occurred on the Client tier between the last Critical event and the current one. Triggering the event means that it is sent, without delay and in a synchronous fashion, to the Application server 116.

Initial requesting of a URL (which is the URL typed in the web browser in order to browse to one entry point of the application) that is managed by Application server 116 causes said Application server 116 to search within Application configuration 108 for a mapping of an application object class (for the given URL). After retrieving the mapped application object class from said Application configuration 108 software component, this class is being initialized to represent the root object of Application objects tree 106 (this means that the root object is being initialized in order to build the entry point of the application and show it on the Client tier). Then a full update command is returned from Application server 116 to Client tier 300, enabling said Client tier 300 to initialize the client interface. Initialization is the process of creating new objects of all the currently shown controls in state and assigning the desired initial state of properties on them. From this point on, the communication between Client tier 300 to Application server 115 is done be means of events and update commands, except when a refresh action is issued (can be issued by pressing the refresh button of the browser or by changing some major property of the application such as its language), which will cause the server tier 11 to send again the full update commands.

When a critical event triggers the event queue sending, Browser controller scripts 127 sends to Application server 116 a queue of actions (provided within Client event queue 129) along with the client unique stamp, for example a time stamp, which is a numeric value representing the last update time of the Client tier 135. Then, Application server 116 within server tier 115 receives the event queue and the client time stamp. After that, the server processes the event queue from the tail to the head, which is the order that the events have occurred. Every event in the event queue has a source value that is an ID (identification) of an application object to which this event is related. Such application object ID, received from the current event, is used when searching Application object index 107 to get an object reference to the application object, to which this event is related. The current event object is sent to a method (the method which is the event handler of the object for this kind of events) of the application object that transforms the object event to a normal event raising (A normal event raising is the server's model of sending events between objects as opposed to non-normal events which are the events sent from the Client tier to the Application Server tier, based on the present invention). Then, the application object depending on the type (control type i.e., Button, Form, ListBox etc.) and behaviors (the method of reaction to each event of that specific application object) that it uses, sends normal code events that can be used by the program code developer. A normal code event is an accepted and well known mechanism of sending messages between objects written in the same technology (i.e. C#, Java etc.) e.g., an object that send a message to inform its container object regarding to some change which occurred in his data as opposed to a non-normal event which this present invention presents. A non-normal event passes between the Client tier and the Application server using this present invention mechanism is for example an HTML rendered element on the client sends an event saying it was clicked; then, when the event is actually raised to the object that should handle it on the Server tier, it is transformed to a normal code event by the present invention mechanism.

After all events have been sent from Client tier to Application server 115, said Application server 115 calls the application root object, which is the root of Application object tree 106, to render the update commands that should be executed on Client tier 300 in order to be synchronized with Application object tree 106. For creating update commands, the client time stamp is sent to the application root object within Application object tree 106, which in turn starts a recursive render action that calls each application object in said Application object tree 106 to check its own time stamp to see if it needs to generate one or more update commands. An application object can hold one or more time stamps so that it can generate different update commands for updating components, when required. This multi time stamp per application object is currently used for partial updating commands (for example, updating only application object attributes such as back color, contained data etc.). Partial commands are used to make the update process as efficient as possible in terms of the number of elements that has to be re-drawn and their complexity.

The update commands created by the Application object tree 106 are sent to Application server 116 within Server tier 115, which in turn sends said update commands as an XML document to Client tier 300. Browser controller scripts 127 receive the update commands and updates XML interface status document 128. Then, the updated elements are transformed one by one into their HTML code representation to be displayed on Display 131, by using XSL document 126. The HTML representation is created by XSL transformation of the XML interface status document 128 with the suitable XSL template (for that element which represents a control).

The management of open applications windows is performed in the same way as of all other application objects, but the update commands that are returned from Server tier 115 to open a window or an update command that keeps a window opened, further contain an indication of a window XML structure (XML elements structures can either be of an Application object contained in a window so that the element will be contained or a structure of a window its self as a root XML node) that represents the current window structure (e.g., main window, modal-dialog or non-modal dialog, dimensions, location etc.). When Browser controller scripts 127 receive the XML structure of opened windows, it scans (loops over the currently opened windows) said opened windows to see if one of them should be closed and scans the window structure to see if a new window should be opened. Managing of the windows content is performed at the same way as managing the main window content (A main window is the browser window which browsed the initial URL at start while other windows are opened on top of the main window during the application run) by managing the application object ID to update is unique so it can be found cross windows, meaning that the application object ID cannot repeat in other windows even though the application object is contained in a completely different container. This way an object can be found uniquely, regardless its containing window, within the XML.

According to an embodiment of the present invention, the layout definitions of conventional desktop applications, which defines docking and anchoring attributes on the layout items, is used. The docking layout is easier to maintain than HTML tables or absolute positioning that conventional web applications use. Eventually, the output remains HTML but the programmer defines only those attributes that relate to docking or anchoring on the application object. Application objects that supports docking expose a Dock property that is an enumerator of "Left", "Top", "Right", "Bottom" and "Fill". These enumerators define the layout behavior of an application object:

Defining the "Top" docking causes the application object to appear at the highest possible position, according to the height definition, and the application object width will be the maximum possible width;

Defining the "Bottom" docking causes the application object to appear at the lowest possible position, according to its height definition, and the application object width will be the maximum possible width;

Defining "Left" docking causes the application object to appear at the most left position, according to its width definition, and its height will be the maximum possible height;

Defining "Right" docking causes the application object to appear at the most right position, according to its width definition, and its height will be the maximum possible height.

Defining "Fill" docking causes the application object to fill the remaining client area. Any application objects which will be defined after a Fill application object will not be displayed at all as the application object with the "Fill" docking has already took all the remaining space.

According to a preferred embodiment of the present invention, takes the ability to absolute position an element in HTML and the ability to add expressions on style attributes (attributes which describe the control's style such as color, dimensions, fonts etc. as opposed to data attributes such as text) which should be recalculated from time to time (recalculation is the action of setting the control's position and dimensions).

When a user surfs to a URL, which is managed by Application server 116 and mapped to an application root object class (the mapping is done so that the application will have an entry point, saying that a specified application object represents the first screen displayed), this class is initialized and acts as the root object for all other application objects on Application object tree 106. Programming the application is done through application events in order to change the current application object tree status (such as programming the code which happens when a button click event occurs, an item from a list is selected etc) and structure (such as programming the code which causes appearance/disappearance of controls, controls' dimensions/styles/state, windows opening etc), and the server reflects these changes in the client's browser through update commands that are used to synchronize the current interface state with the application object tree state. Managing the web application windows is also done through the application object tree. Opening a window requires the programmer to create a new instance of an object that inherits from a window class. Calling the "show window" function (which is the function that commands the server to show an instance of a window) of this object marks this window object as visible, which in the next update commands will add this window to the window structure part of the response, notifying the browser that a window was created on the server and it should open a new window and renders it's content. When calling "hide window" function which is the function that commands the server to hide an existing window and send back to the client a new update command which does not contain the issued window structure, saying that this window should be closed. The browser always compares its currently opened windows with the list windows structures in the update command; then there are 3 possible cases:

1. A window exists in both the update command and the XML interface status document 128, then, the window should stay open, since it is visible in both Server tier state and Client tier state.
2. A window exits in the update command and does not exist in the XML interface status document 128, then, a new window with the specified content within the new window structure should be opened, since it is visible on the Server tier state but it is not visible on the Client tier state.
3. A window does not exists in the update command but does exist in the XML interface status document 128, then, the issued window should be closed, since it is not visible on the Server tier state but it is visible on the Client tier state.

The prior art web applications environments are page-based, which means that a URL is called with data that is combined with the session data and other system resources like database records that are used to fully render a new page to the client. Updating the client interface requires a page to be fully rendered by the server, be sent to the browser and be rendered by the browser to update its interface. Passing this behavior in those environments requires scripts running in the browser to call an HTTP request to pages on the server and update the interface of the browser.

While this web application development environment uses client scripts to accomplish its tasks it does so through a basic sets of scripts that are used to update client interface and send back events from the client and all the processing is done on the server side generating update commands that are used to update the client interface. Thus, the need for the application programmer to code his web application, using client scripts, is eliminated. The application programmer handles the application object tree events and by changing the application object tree structure and state, through those event handlers, he is indirectly interacting with the user interface.

According to the prior art, Web pages are fully rendered on the server and client sides. This web application development environment uses XML HTTP as both its synchronous and asynchronous mediator and the content sent is an event queue which consists of relevant changes and actions that took place in the browser. With the event queue, a client time stamp is also being sent to the server which is used to render update commands after the event queue is processed and the event handler code were executed. Changes made by the event handlers to the application object tree elements, causes each changed element to have a different last updated time stamp and by traversing the application object tree recursively and comparing the client time stamp to that of each application object tree element, a list of update commands can be extracted and used to update the client interface so it will be synchronized with the application object tree. This mechanism optimizes the size of the data sent to the server and returned from the server to a minimum. Event queue mechanism used by this web application development environment optimizes server calls so that events that do not have to be processed on the server are not sent, and only when an event that has to be processed is taking place, it is sent. The event queue is optimized even more when redefining unique events, which means that some events cancel each other. For example: if a user changes a splitter position on the screen and then changes it again the first event value is not relevant and will be deleted from the queue.

According to a preferred embodiment of the present invention, importing a legacy application (e.g., utilities, client/server applications etc) from any existing desktop environment to web is possible. In addition, the higher security level is achieved, since the browser holds no business logic scripts (such as application validations, passwords, hidden fields, tokens etc), and substantially almost no data, besides presentation data which enables the creation of the current view presented at any given time.

While some embodiments of the invention have been described by way of illustration, it will be apparent that the invention can be put into practice with many modifications, variations and adaptations, and with the use of numerous equivalents or alternative solutions that are within the scope of persons skilled in the art, without departing from the spirit of the invention or exceeding the scope of the claims.

The invention claimed is:

1. A method of application object management, comprising:
    managing a plurality of different applications on a server;
    receiving, from a client hosting an operating system and a browser, a plurality of requests for a plurality of application objects of said plurality of different applications;
    forwarding a generic static code to said client which executes said generic static code under said operating system;
    forwarding, from said server, a plurality of commands each indicative of a state of another of said plurality of application objects to said client so as to allow said generic static code, which is hosted by said client, to render each said application object according to a respective said state by said browser;
    receiving, from said client, a plurality of client events each pertaining to a different application object of said plurality of application objects;
    identifying, for each one of said plurality of client events, a respective of said plurality of different applications; and
    updating each said state by processing said plurality of client events on said server according to said identification;
    wherein each said command comprises a command for updating a presentation layer object depicting a respective said application object;
    wherein said generic static code manages communication between said client and said server, the communication including said forwarding and said receiving.

2. The method of claim 1, further comprising forwarding an additional command indicative of said updated states to said client so as to allow said generic static code to render said plurality of application objects according to said updated states.

3. The method of claim 1, wherein said receiving comprises receiving a timestamp associated with said command, comparing said timestamp and a previous timestamp associated with of a respective state of a respective said application object, said updating is performed according said comparison.

4. The method of claim 1, wherein said presentation layer object is a screen layout object of said presentation layer.

5. The method of claim 1, wherein said command does not contain a logic script pertaining to a respective said object application.

6. The method of claim 1, wherein said command is in an extensible markup language (XML) form.

7. The method of claim 1, wherein said managing, said forwarding, and said receiving are performed on a common layer.

8. The method of claim 1, wherein said managing comprises initializing said plurality of applications in response to a request from said client.

9. The method of claim 8, wherein said request is a uniform resource locator (URL) access request.

10. The method of claim 1, wherein each said application object is a window structure.

11. The method of claim 1, wherein said managing comprises initializing said plurality of application objects on said server and tagging each said application object with an unique identifier; wherein said managing, forwarding, receiving, and updating are separately performed on said server for each said application object, said generic static code separately update each said application object.

12. A system of application objects management, comprising:
    a server configured for managing a state of each of a plurality of application objects of a plurality of applications and to deliver a plurality of generic static codes to a plurality of hosting clients each having an operating system, each of said plurality of generic static codes being configured for rendering a display of any of said plurality of application objects of any of said plurality of applications on one of said plurality of hosting clients, under a respective said operating system;
    wherein said server forwards command indicative of an update in a respective said state to a respective said generic static code so as to allows said respective generic static code to update accordingly a respective said display;
    wherein said respective generic static code forwards at least one client event pertaining to said respective application object, said server processing said at least one client event and updating a respective said state accordingly;
    wherein said command comprises instructions for updating a presentation layer object depicting a respective said application object;
    wherein said generic static code manages communication between said client and said server, the communication including said forwarding.

13. The system of claim 12, wherein server managing and processing a logic script of each said application object.

14. The system of claim 13, wherein said logic script is not processed by said client.

15. A method of rendering application object, comprising:
    receiving via a network and installing into a client memory, on a client side having an operating system, a generic static code;
    receiving via said network, on said client side, a command indicative of a state of at least one application object of one of a plurality of applications managed by a server connected to said network;
    using said generic static code under said operating system to identify said at least one application object and to render said at least one application object by a browser according to said command;
    capturing at least one client event pertaining to said at least one application object; and
    forwarding said at least one client event with an identification (ID) of said at least one application object to said server so as to allow a processing thereof on said server and updating said state according to said processing;
    wherein said command comprises instructions for updating a presentation layer object depicting a respective said application object;
    wherein said generic static code manages communication between said client and said server, the communication including said forwarding and said receiving.

16. The method of claim 15, wherein said capturing further comprising queuing a plurality of client events pertaining to said at least one application object, said forwarding comprises forwarding said plurality of client events to said server in response to a detection of an event so as to allow a processing thereof on said server and updating said state according to said processing.

17. The method of claim 15, wherein said updating comprises verifying a timestamp of said at least one client event in relation to another timestamp of said application object.

18. The method of claim 15, wherein said at least one application object is a converted desktop application.

19. The method of claim 15, wherein said receiving comprises locally storing a copy of said state; further comprising synchronizing between said copy on said client side and said state on said server.

* * * * *